US007290702B2

(12) United States Patent
Elberbaum

(10) Patent No.: US 7,290,702 B2
(45) Date of Patent: Nov. 6, 2007

(54) METHOD AND APPARATUS FOR RECORDING AND UTILIZING UNKNOWN SIGNALS OF REMOTE CONTROL DEVICES

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 401 days.

(21) Appl. No.: 11/024,233

(22) Filed: Dec. 28, 2004

(65) Prior Publication Data

US 2006/0138231 A1 Jun. 29, 2006

(51) Int. Cl.
*G06K 5/00* (2006.01)

(52) U.S. Cl. ........................ 235/380; 235/375; 235/382

(58) Field of Classification Search ................ 235/375, 235/380, 382; 341/176; 340/825.22
See application file for complete search history.

(56) References Cited

U.S. PATENT DOCUMENTS

2001/0010503 A1* 8/2001 Darbee et al. .............. 341/176
2002/0141731 A1* 10/2002 Elberbaum .................. 386/46

* cited by examiner

*Primary Examiner*—Karl D Frech
(74) *Attorney, Agent, or Firm*—Katten Muchin Rosenman LLP

(57) ABSTRACT

The invention provides a method and apparatus for using a remote control device such as car key that generates unknown coded signal with other appliances, such as building's door, garage door or parking barriers, by demodulating and detecting time durations, sequence and other data pertaining the envelope of the unknown coded signal and storing the envelope data into a memory for comparing the stored envelope data with a data of an envelope of a newly received unknown coded signal and outputting match signal when the stored data and the newly received data match. The match signal can be used to operate locks, doors and barriers also in conjunction with systems including video interphone, alarm, emergency and access control system.

29 Claims, 7 Drawing Sheets

Principle Data bit waveform for OOK (ON/OFF) modulation

Principle Data transmission for FSK (FM) modulation

Principle Data transmission for ASK (AM) modulation

Typical TTL high/low data bit waveform used for access control

Typical TTL high/low data bit waveform used with OOK transmitter

Typical data bit waveform used with FM-O modulation

METHOD AND APPARATUS FOR RECORDING AND UTILIZING UNKNOWN SIGNALS OF REMOTE CONTROL DEVICES

BACKGROUND OF THE INVENTION

1. Field of the Invention

This invention is related to IR or RF remote control keys or devices and to video interphone or door phone devices and systems, alarm devices and systems, access control devices and system, and car parking devices and systems.

2. Description of the Prior Art

Remote control access devices such as a key or key holder incorporating InfraRed (IR) or RF transmitter for remotely locking and unlocking a car or for activating the car alarm or for locking the car and arming the car's alarm, including such entry devices used for accessing parking areas or building entries through magnetic card readers, RFID readers, proximity readers and other identity readers are all employing serial coding that are configured, processed and used for operating only with specific equipment or systems. The problem of such devices is that each manufacturer of a remote control or access entry device uses proprietary technologies with randomly selected frequencies, bandwidth, clocks, signal levels, signal polarities, modulation and coding techniques, all of which makes the remote control access devices by different manufacturers wholly incompatible. This prevents the use of one remote control access device for different applications and/or for systems produced by 3rd party manufacturers. The result is that a car key or key holder incorporating IR or RF remote control device made for a specific car cannot be used with other cars or with the car owner's garage or apartment door entry system. A car owner that owns several cars and uses remote control device to open his garage door or main entrance door and/or activate different alarm systems needs to carry several keys or key holders or other entry access devices, which is costly, cumbersome and inconvenience.

SUMMARY OF THE INVENTION

It is an object of the present invention to provide for a method and apparatus for recording and utilizing unknown signal of a remote control device including a device, selected from a group consisting of a key, key holder, card, tag, strip, button, charm, pendant, bracelet and a combination thereof for using said remote control device through an interfacing circuit including at least one receiver selected from a group consisting of RF receiver, IR receiver, access control reader, data receiver and a combination thereof with appliances selected from a group consisting of door locks, house doors, building doors, car locks, car doors, car ignition, car alarm, barriers, garage barriers, parking barriers, alarm sensors, alarm controllers, emergency sensors and emergency controllers. Further object of the present invention is to connect said interfacing circuit with systems selected from a group comprising of video interphone system, door phone system, alarm system, emergency system, access control system, parking system and a combination thereof.

Another object of the present invention is to provide for a method and apparatus for recording and utilizing unknown coded signals selected from a group consisting of serial coded signal, parallel coded signal, data signals and a combination thereof outputted from a reader selected from a group consisting of punched card reader, magnetic card reader, bar code reader, optical card reader, finger print reader, eye pattern reader, face recognition reader, RFID reader and a combination thereof for using said unknown coded signal with appliances selected from a group consisting of door locks, house doors, building doors, car locks, car doors, car ignition, car alarm, barriers, garage barriers, parking barriers, alarm sensor, alarm controllers, emergency sensors, and emergency controllers.

Further object of the present invention for a method and apparatus for recording and utilizing unknown coded signal is to connect said reader with systems selected from a group consisting of video interphone systems, door phone system, alarm system, emergency system, access control system, parking system and a combination thereof.

The apparatus for recording and utilizing unknown coded signals and other objects of the present invention are attained by using one or more RF receivers for receiving one or more specific or broadband frequencies that are approved by the authorities, such as FCC approval of unlicensed frequencies within the USA. The unlicensed frequencies are the well known frequencies used for remote control devices or alarm devices, identified as specific frequencies of 308.825 MHz, 315 MHz, 418 MHz, 433 MHz, 914 MHz and 916.5 MHz, or as 308~315 MHz band, 415~435 MHz band and 913~918 MHz band.

It is possible to use a single broad band receiver for covering the entire 300 MHz up to 950 MHz range, but in practice it is preferable to use at least two separate receivers for receiving the RF signals generated by any remote control devices, one receiver covers the 300~450 MHz band and the second covers the 900~930 band. Because of the very low RF power transmission permitted by FCC it is preferable to use three receivers, one for the 308~315 MHz band, the second for 415~435 MHz band and the third covering the 913~918 MHz band. If more bands or specific accurate receivers for specific frequencies are needed, any number of matching receivers can be added and used.

Each of the receivers includes receiving antenna and a demodulator for demodulating the received signals. Each demodulator includes well known circuits that are designed for demodulating on-off keying, known as OOK modulation, amplitude shift keying, known as ASK or AM modulation and frequency shift keying, known as FSK or FM modulation.

The well known demodulator circuits can be demodulators that are incorporated in the well known single package receiver ICs that are commercially available at low cost, or they can be made by standard well known circuit components, such as transistors, diodes, filters, coils and other well known components and designed to accommodate and demodulate an OOK, ASK, AM, FSK or FM modulated signal.

Hence, the first step of the method for recording and utilizing unknown coded signals is to receive said unknown coded signals through said at least one receiver and demodulate the received signals on the basis of a modulation selected from a group consisting of OOK, ASK, AM, FSK or FM modulation.

The demodulated signal is a low frequency envelope of the original encoded transmission, generated by the remote control device. The envelope signal is outputted from the demodulator through a well known Low Pass Filter, known as LPF, that allows the low frequency of the envelope to pass and blocks the high frequency carrier and/or high frequency noises from the output signals, by this the demodulated output or the envelope signal is reproduced into clean envelope of the original code generated by a given remote control device, such as RF key, or IR key or the code embedded in a magnetic key or card that are processed through a magnetic key or card reader and which consist of serial digital code.

The demodulated envelope signal can be further processed by a well known digital circuits such as digital signal amplifier for amplifying the signals to an over size signal, a well known clipper circuit and a clamping circuit for clipping the signal to its specified level and for clamping the envelope lows or highs to a selected reference, thereby providing clean envelope signal with sharper edges, noise free and with correct levels. Further, the envelope signal can be reversed by a well-known inverter circuit for unifying the polarities of the envelope signals of the different remote control devices.

There is a timing error in the rise and fall times of each individual pulse of the demodulated envelope because of the processing delay, however the errors are insignificant and moreover the errors are repetitious, and as explained later, because the errors are repetitious they present no comparison errors between the stored signals and any freshly received unknown signals of the remote control devices.

The demodulated envelope signal is fed to a gating input of a counter and to an input of a CPU. Many different well known counters and counting methods can be used for recording and utilizing the unknown coded signals, and moreover many of the current well known CPUs, such as the well known microprocessors that are commercially available at low cost, incorporate counting and timing circuits, thereby providing for connecting and feeding the envelope signal directly to the CPU, making the counter as a separate circuit unnecessary and not used, which is the preferred embodiment of this invention. However for clarification the counter is explained below as a separate circuit.

The counter is fed via the CPU with high frequency clock, for example 10 MHz, by this the counting error of a single pulse width and/or the fall or rise time during the counting of the envelope is reduced to units of 0.1 μsec or 100 nsec, which are insignificant time units for the low frequencies of the unknown coded signals that are ranging from 200 Hz and up to 100 kHz.

The counter is an up-down counter with a separate preset output and is gated by the envelop signal such that a pulse rise resets the counter to zero and starts the up counting, while a pulse fall also resets the counter to zero but starts the down counting. The counter outputs to the CPU a positive counted number for the duration of the highs of the envelope and a negative counted number for the duration of the lows of the envelope. The CPU that also reads directly the inputted envelope can therefore record the duration of each individual high and low of the envelop signal, the number of highs and lows, the total lows, the total highs, the total length and the total sum pertaining the unknown coded signal as represented by the envelope. Considering the example of the 10 MHz clock, the accuracy of the counting will be 100 nsec units of time.

Accordingly, the second step of the method for recording and utilizing unknown coded signals is to feed the envelope of the demodulated signal to a counter of a CPU for counting the content of said unknown envelope, selected from a group consisting of the duration of each high and each low states, the sequence of each high and each low, the total number of highs and lows, the total lows duration and total highs duration, the total sum, the total length (in time) of the envelope and the polarity of the envelope and a combination thereof.

The counted values of said unknown coded envelope of an unknown coded signal are recorded by storing the counting details into a memory and utilizing the recording of said unknown coded envelope for accessing said appliances and/or systems by said remote control devices. The recording also include such details as listing the owner of each remote control device and other details pertaining said owner, as well as other items such as the door to be opened, or the alarm system to be activated and/or the barrier to be raised.

The third step of the method for recording and utilizing unknown coded signals is therefore, the storing of the counted values of said envelope into a memory.

Once the recording of the counting details of said unknown coded envelope is complete, the receiving, decoding and counting of the envelope of a repeat fresh transmission by said remote control device for accessing purpose is compared with the stored values of said unknown coded envelope. Only when both values match the CPU will generate a match signal for activating a buffer or relay circuit for opening doors or for deactivating alarm system or opening parking barrier or for such function as providing access to a building by recalling of an elevator to the lobby floor.

Accordingly, the forth step of the method of the present invention is the counting of a fresh envelope of a freshly received signal for comparing the freshly counted values of said fresh envelope with said stored values for generating a match signal when said freshly counted values match the stored values.

The method and apparatus for recording and utilizing unknown coded signal of the present invention provides for the use of IR remote control devices the same way it provides for the RF remote control devices. For this purpose at least one IR receiver comprising IR filter, lens and photo sensing diode, along with demodulator and processing circuit are incorporated in the apparatus for recording and utilizing unknown signals. The demodulator for demodulating and processing the received IR signals is similar to said RF demodulator and processor. The commonly used demodulator circuit of said IR receiver is OOK type because the commonly used IR remote control devices are operated on the basis of on-off keying, but any other modulation and demodulation circuits can be employed.

The steps of decoding, counting and storing the unknown coded signal generated by an IR remote control device and the steps of comparing the freshly counted envelope of the received IR signals are same as the steps described for the received RF signals. Same also applies to an unknown reader output signal, or directly fed serial or parallel code signals, all of which are processed and their envelopes are shaped, counted and stored the same way as described for the received RF or IR signals.

The remote control devices, including such devices as magnetic card or a barcode card, are configured to transmit or to generate via their corresponding readers respectively a complete, whole code. Some types of remote control devices are configured to repeat the transmission of the serial coded signal, others transmit the complete serial code once per each touch of a key. However all the remote control devices transmit a complete coded signal, which commonly starts with a pilot bit, sync bit and/or start bit and ends with an end bit.

The commonly used receivers, readers and the processors for the remote control devices and/or the magnetic, proximity and other keys or cards are pre configured to read and accept only incoming coded signals that precisely match the pre configured codes, the timing of the pulses, the pulses duration and the precise start bit, the address data, command data and other exclusively configured programs to ensure that only an exclusive pre configured and pre programmed match can access the appliance and/or the system.

In contrast, the present invention provides for the use of any such remote control devices, including such devices as magnetic cards, barcodes, proximity keys and other access devices by recording the complete unknown coded signals, including such pulse items as pilot, sync, start bit and end bit, all of which become leading pulses and ending pulses within the unknown recorded signals, stored into said memory.

Therefore, for the counting process of the present invention there is no specific need for pilot bit, sync bit or start bit to initiate the counting process, and the counter starts its counting whenever its gate input is fed with a rise or a fall in the envelope signal fed to it. For ending the counting and/or for completing the counting process of the received signal the counter is programmed to reset itself and stop counting whenever the high or low state remains for a longer duration than “n” milli seconds.

The resetting of the counter also provides for resetting the system's CPU into its receiving state and for enabling the receiving of a freshly transmitted signal. It is simple to configure the “n” duration, for example, when the slowest rate of the unknown code signal is 1 kbit/sec the width of each low and/or high state of the envelope signal cannot practically exceed 1 milli second duration, therefore “n” duration of longer than, for example, 10 milli second or 100 milli seconds can be safely configured as an error free end of the transmission, or to identify no transmission state and therefore, provide for the counter to reset itself and the resetting of the CPU to its “receiving ready” state, readying the system for the next fresh receiving.

Accordingly, the next step of the method for recording and utilizing unknown coded signal is therefore the resetting of the counter and the CPU to their “receiving ready” state whenever the duration of any of the low or the high states of the envelope signal is longer than a preprogrammed “n” time duration.

It is preferable that a remote control device such as an IR key holder that is equipped with multiple touch keys such as alphanumeric can access for example, into a parking system, by keying a programmed password through the touch keys of the remote control device. The limitation for multiple keying of unknown coded signals will therefore be the time spacing between the keying, which must be longer than said “n” time duration. As the “n” time duration is a fraction of a second, such as between 10 milli second and 100 milli second, such short time duration does not prevent in any practical way the multiple keying of a password via said keys of said remote control device.

The sequence of the keying of a password, for example, the envelope counted values of four digits in sequence of 3-1-4-2 are recorded individually one after another into the memory, for which the CPU is programmed to compare the four separate envelope counts in the sequence of a freshly received signals and only when all said fresh envelope signals of all the four individual numeric coded transmissions match the separately four stored signals and their sequence matches the programmed sequence, only than the CPU will generate a match signal to the buffer circuit for enabling the activation or deactivation of said appliances and/or of said systems.

Similarly, it is possible to program a repeat transmission by any of said remote control devices in order to access the entrance of a building and/or to arm an alarm system of a given apartment. This can be achieved by repeating the recording of the unknown envelope count and/or by programming the CPU to generate match signal only after receiving match signal “n” times in succession.

BRIEF DESCRIPTION OF THE DRAWINGS

The foregoing and other objects and features of the present invention will become apparent from the following description of preferred embodiments of the invention with reference to the accompanying drawings, in which.

DETAILED DESCRIPTION OF THE PREFERRED EMBODIMENTS

Figure 1:
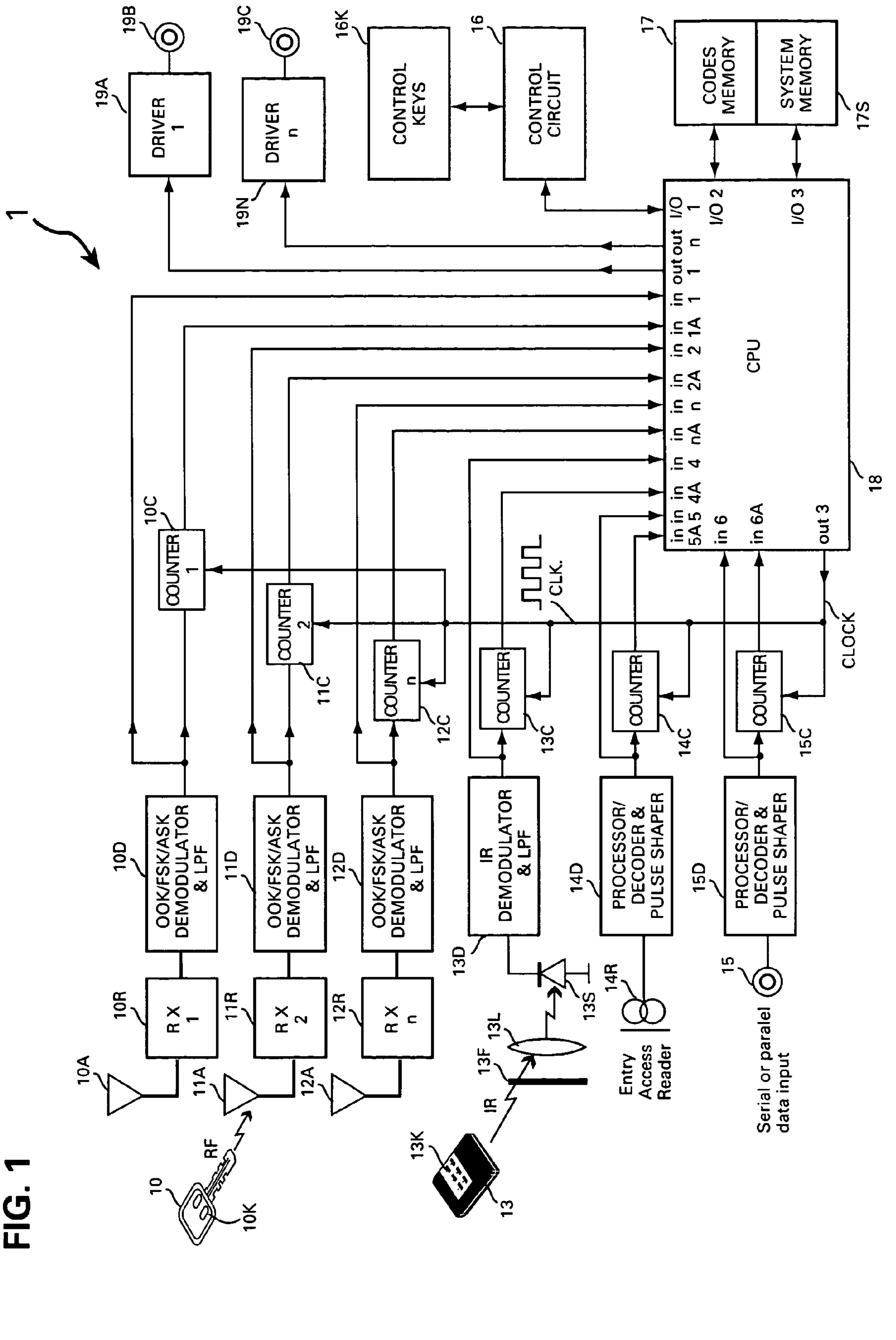
FIG. 1 is an electrical block diagram of the apparatus for recording and utilizing unknown coded signals of the present invention.

Shown in FIG. 1 is the apparatus 1 for recording and utilizing unknown signals of remote control devices such as RF key 10, IR remote control 13, an access reader 14R and an input 15 for a serial or parallel data. The apparatus 1 includes n number of RF receivers shown in FIG. 1 as 10R, 11R and 12R, each of said receivers is connected to a receiving antenna 10A, 11A and 12A respectively and to a demodulator circuit 10D, 11D and 12D respectively. Each of the demodulator output is fed to a counter 10C, 11C and 12C and to an input of the CPU 18 in 1, in 2 and in “n” respectively. The CPU 18 is connected through its I/O 2 and I/O 3 terminals to a memory 17 and 17S for recording counted data of unknown signals generated by said remote control devices and by said access reader 14R and said data through said input 15, as well as to record information pertaining the users of the remote control devices and any other data pertaining the system operation and its parameters.

The CPU 18 is further connected to the control circuit 16, which is an internal circuit of the CPU 18, but shown in FIG. 1 as a separate circuit, and to the control keys 16K. The controls key 16K are used for processing the recording of the unknown coded signals and for entering data relating to the remote control device, the owner of the remote control device and other details, such the owner's apartment number, the alarm system of the apartment, the specific door to be opened or the specific parking barrier to be raised and/or such items as the elevator to be recalled and to what floor. The keys 16K can also be used to setup the functions of the apparatus 1 that may be connected to a given system such as video interphone system shown in FIG. 7 or to a parking control system (not shown). The control keys 16K can be a common ASCII keyboard such as used for PC, or it can be a set of push, touch or other keys of the apparatus 1.

The CPU 18 is further connected to "n" drivers shown as 19A and 19N for providing buffered or driver outputs 19B and 19C of the CPU output fed through terminals out 1 and out n. The driver output 19B or 19C can be a relay, or electric switch for activating electric door locks, or car locks or garage barrier, alternatively the driver circuit can be a buffer amplifier for outputting serial or parallel coded command for recalling elevators or for arming or disarming alarm or emergency devices and systems and/or for switching on or off the emergency lighting system.

Each of the outputs of the demodulators 10D, 11D and 12D is connected individually to a gated input of a respective counter 10C, 11C and 12C for counting a clock fed from the output terminal out 3 of the CPU 18 to the clock input of the counters 10C, 11C and 12C.

The counters 10C, 11C and 12C are up-down counters with a separate preset output and are gated by the envelope signals fed from the demodulators 10D, 11D and 12D. The up-down counting is set by the rise and the fall time of the gate signal, wherein a pulse rise resets the counter to zero and starts the up counting, while a pulse fall also resets the counter to zero but starts the down counting.

The receivers 10R, 11R and 12R are well known receivers in the UHF band, that are commonly available in a single chip IC at low cost, and include the demodulator circuit 10D, 11D and 12D that are shown in FIG. 1 as a separate demodulator and LPF circuit. The receiver RX1 10R, RX2 11R and RXn 12R are n number of receivers to cover any number of specific frequencies and or bands within the permissible spectrum of the UHF band. The frequencies used for remote control devices and for short distance data communication are known in the USA as unlicensed frequencies, approved by FCC and are identified as specific frequencies of 308.825 MHz, 315 MHz, 418 MHz, 433 MHz, 914 MHz and 916.5 MHz, or as 303~315 MHz band, 415~435 MHz band and 913~918 MHz band. Though these frequencies are freely available, the FCC attaches very stringent limits, governing the transmission power to a maximum of micro watts and milli watt levels. This mandates very sensitive receivers, which means, tuned receivers with narrow bandwidth for improving the signal to noise ratio.

It is possible to use single broadband receiver to cover the entire UHF spectrum of 300 MHz~950 MHz range or any other spectrum range, but such wide band receiver cannot have good signal to noise ratio for the very low signals generated by the remote control devices.

Therefore, to obtain better reception and to improve upon the signal to noise ratio of the receivers it is advisable to use in the USA at least two receivers one covering the 300 MHz~450 MHz band and the other covering the 900 MHz~930 MHz band. The preferable setup will be three receivers, the first for 308 MHz~315 MHz, the second for 415 MHz~435 MHz and the third for 913 MHz~918 MHz. Such narrow bands can provide high sensitivity and low noise reception and due to the very low cost of such single chip receiver IC, the including of three receivers or more such as one for each specific frequency is very cost performance effective.

Each of the shown receivers RX1 10R, RX2 11R and RXn 12R are connected to an individual antenna 10A, 11A and 12A respectively and because the antenna's length is equal to ¼ or ⅛ of the wave length, they can be a designed as a line or loop onto the printed circuit board of the apparatus 1, with literal insignificant cost in production.

The demodulators 10D, 11D and 12D shown in FIG. 1 as a separate circuit include well known circuits that are designed for demodulation on-off keying, known as OOK modulation, amplitude shift keying, known as ASK or AM modulation and frequency shift keying, known as FSK or FM modulation.

Figure 4A:
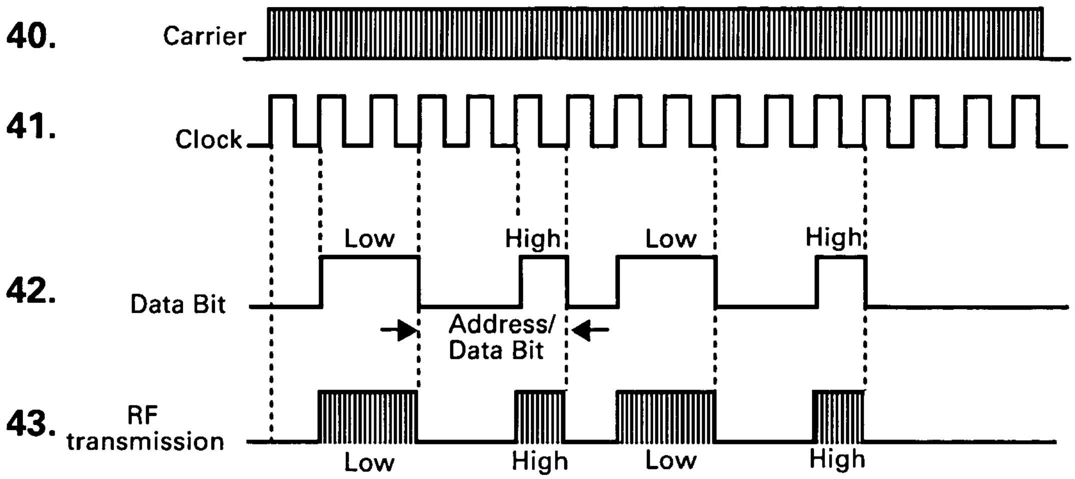
FIGS. 4A~4C are waveforms processed and transmitted by the well known RF remote control devices.

Shown in FIG. 4A is a typical OOK modulation waveform known as On-Off Keying. The carrier signal 40 is keyed on and off by the data bit pulses 42 comprising narrow pulses for high state and wide pulses for low state, however the width of the pulses can be reversed. The narrow and the wide pulses are generated on the basis of integer number of clock pulses 41, such as one clock width is high and two clock width is low, as shown in the waveform 42. The data bit pulses key on and off the carrier 40 to transmit coded RF signal shown in waveform 43.

Figure 4B:
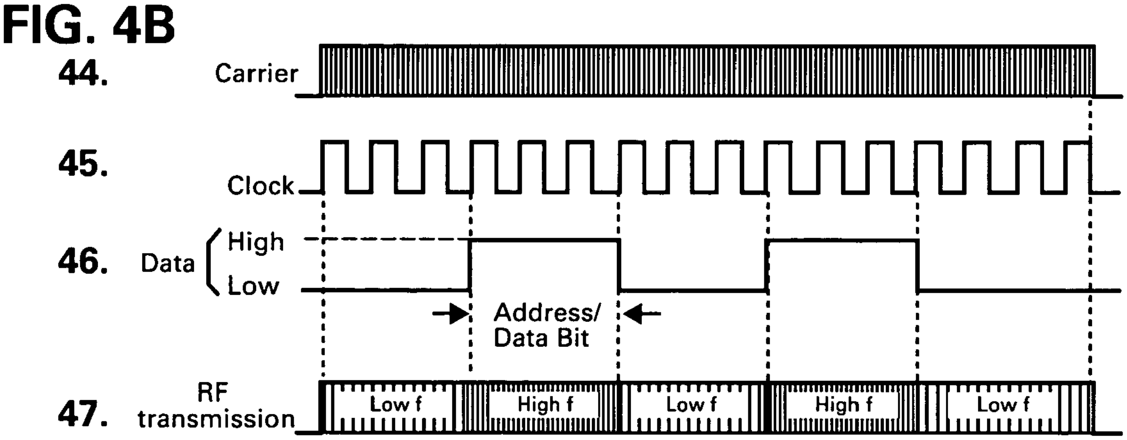

FIG. 4B shows a typical waveform of FSK or FM modulation known as Frequency Shift Keying. The frequency of the carrier signal 44 is shown as the high state frequency of the RF transmission shown in the waveform 47. The data shown in waveform 46 is the high-low level data of the commonly known digital data. Here too the data is synchronized with the clock 45 for keying synchronously the carrier to shift the frequency to a low state. The high and the low state of the carrier frequencies can be high frequency for high and low frequency for low, as shown in waveform 47, but the frequencies can be reversed. The difference between the FM and FSK modulation is the range of shifting frequencies, wherein FM provide for varying frequency change and the FSK is limited to the switching over of two frequencies.

Figure 4C:
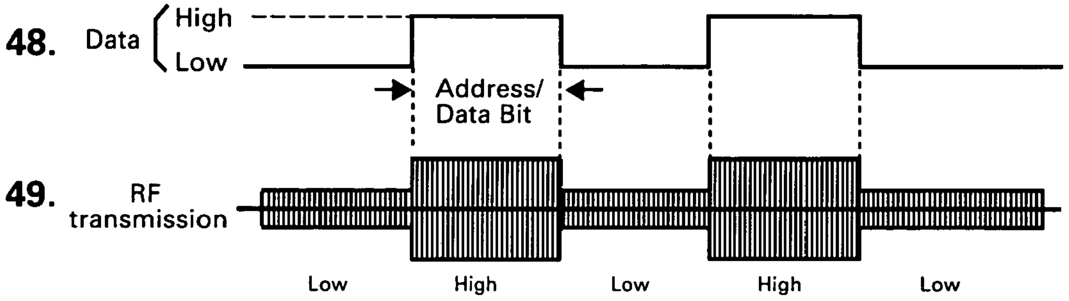

FIG. 4C shows typical waveforms of ASK and AM modulation, known as Amplitude Shift Keying. The carrier of FIG. 4C is the same carrier shown in waveform 44 and the data waveform 48 is the same data shown in the waveform 46. The RF transmission shown in waveform 49 is typical well known dual side band amplitude modulation, and in practice the ASK uses the well known single side band amplitude modulation. Here too the difference between the ASK and AM modulation is the varying levels of amplitude modulation and the fixed two levels for ASK modulation. Also, though the High bit data 48 shows high carrier level 49 and Low bit data 48 is transmitted as low level carrier 49, this can be reversed as well.

The pulse durations of the lows and highs of the waveforms 46 and 48 are shown with identical time duration for the high and low data, however the pulse duration or the pulse width commonly used for FSK, FM, ASK and AM modulations are the data bit shown in 42.

The RF transmitters for generating waveforms such as shown in FIGS. 4A, 4B and 4C used for the remote control devices 10 of FIG. 1 are commonly available in a single package ICs at low cost, or are made by standard well known circuit components, such as transistors, diodes, filters, coils and other known electric components.

Figure 3:
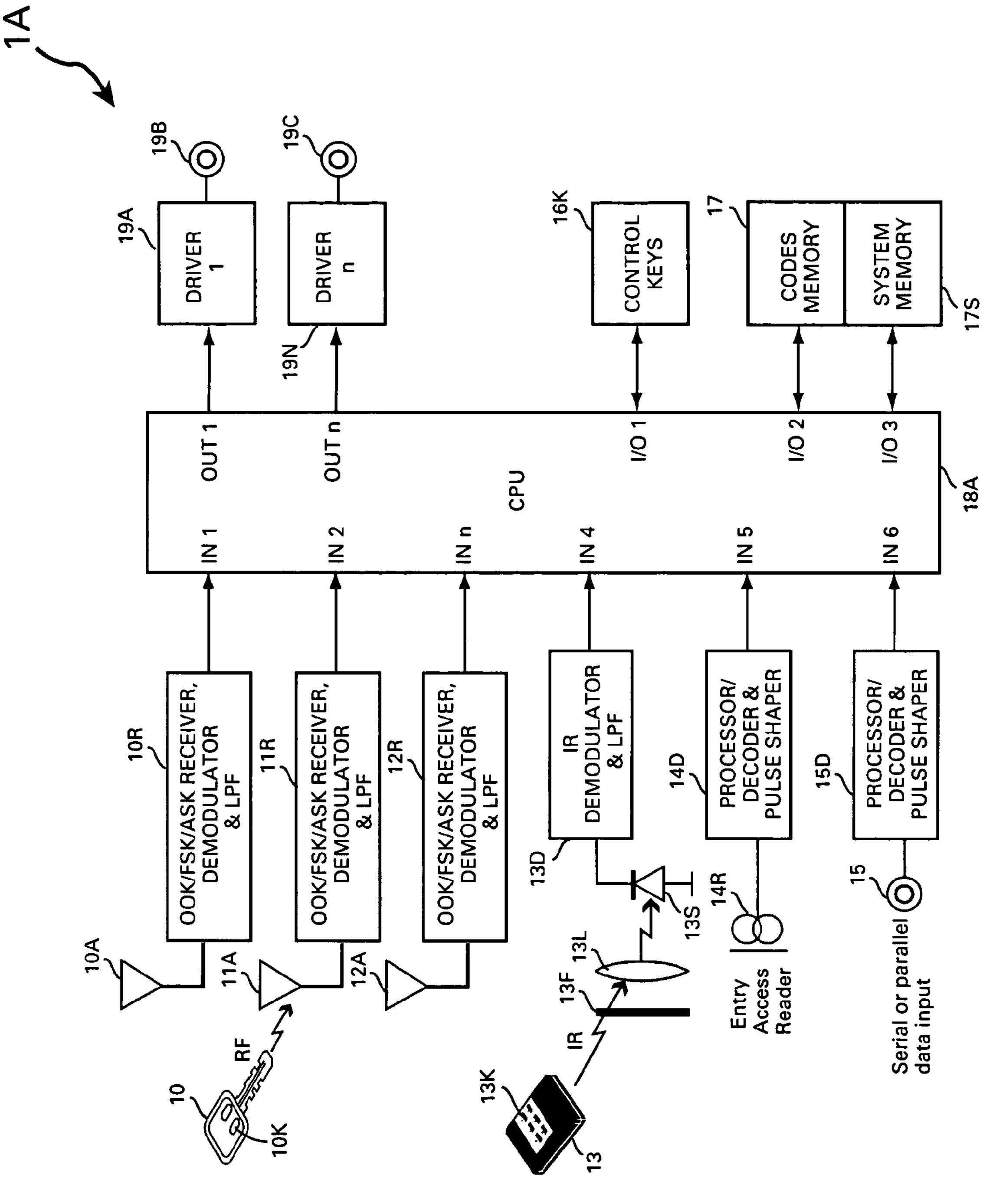
FIG. 3 is an electrical block diagram of the preferred embodiment of the apparatus for recording and utilizing unknown coded signals of the present invention.

Similarly, the well known single package receiver ICs shown in FIG. 3 as RX1 10R, RX2 11R and RXn 12R include the demodulator circuit 10D, 11D and 12D of FIG. 1 and are commercially available at low cost. Otherwise, the demodulators such as 10D, 11D and 12D can be made by standard well known circuit components, such as transistors, diodes, filters, coils and other known electric components and designed to accommodate and demodulate an OOK, ASK, AM, FSK or FM modulated signal.

The remote control device 10 is activated by a push or touch key 10K for transmitting a serially coded RF modulated signal. The serial code for modulating the RF signal or the encoding signal is a low frequency signal, having baud rate in a range of up to 1 kbit/sec. The commonly used remote control devices 10 will transmit the whole code at least once per each touch of the key 10K and the transmitted RF signal is received by the receiver 10R, 11R or 12R through its antenna 10A, 11A or 12A. The receiver output signal is fed to the demodulator 10D, 11D or 12D respectively for demodulating the signal.

The demodulated signal is a low frequency envelope of the original encoded transmission, generated by the remote control device 10. The envelope signal is outputted from the demodulator through a well known Low Pass Filter 27B, known as LPF shown in FIG. 2C, that allows the low frequency of the envelope to pass and blocks the high frequency carrier and/or the high frequency noises from the output signals, by this the demodulated output or the envelope signal is reproduced into clean envelope of the original code generated by a given remote control device 10.

Figure 2A:
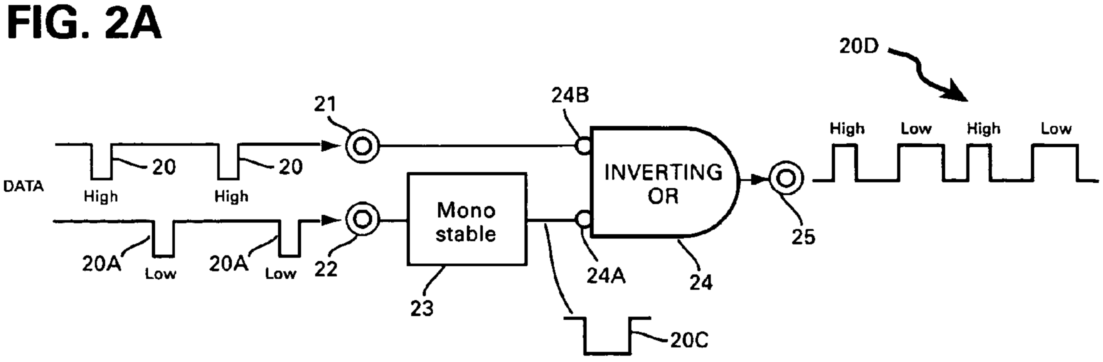
FIGS. 2A~2D are electrical block diagrams of typical digital and data signal processing, shaping, converting and counting for use with the apparatus of the present invention.
Figure 2B:
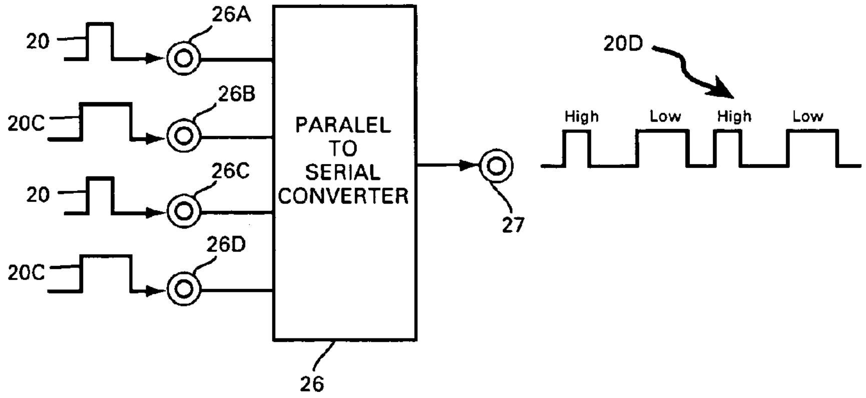
Figure 2C:
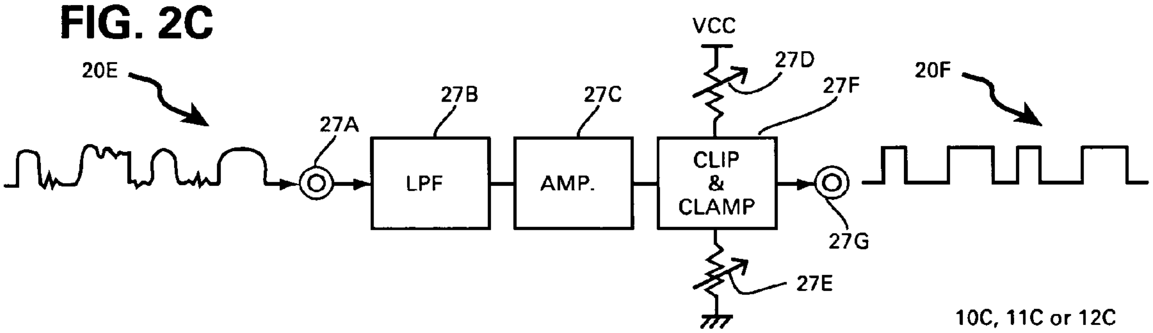

The demodulated envelope signal can be further processed by a well known digital circuits such as digital signal amplifier 27C shown in FIG. 2C for amplifying the signals to an over size signal, a well known clipper circuit and a clamping circuit 27F for clipping the signal to its specified level and for clamping the envelope lows or highs to a selected references, selected through, for example, the potentiometers 27D and/or 27E shown in FIG. 2C, thereby providing a clean envelope signal 20F with sharper edges, noise free and with specified levels and clamped. Further, the envelope signal can be reversed by a well-known inverter circuit such as the inverting gate 24 shown in FIG. 2A, for unifying the polarities of the envelope signals of the different remote control devices 10, even though such unified polarities are not necessary for the recording and utilizing unknown coded signals of the present invention.

Figure 6A:
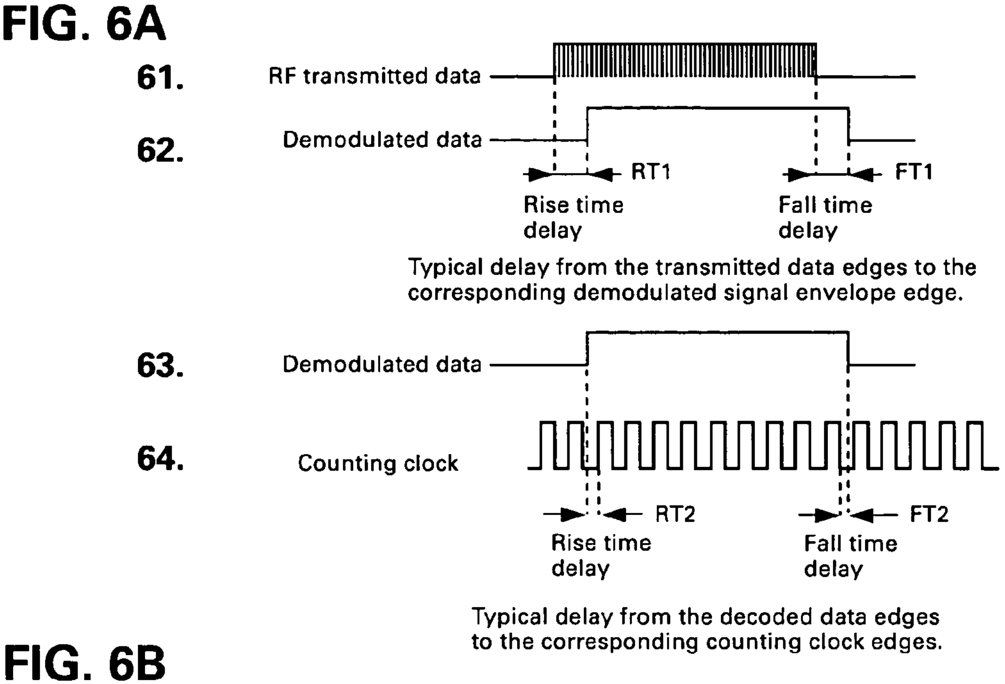
FIGS. 6A and 6B are waveforms showing the rise and fall time errors of a demodulated envelope signal and of the counting errors of a clock gated by the demodulated envelope.

There is a timing error in the rise and fall times of each individual pulse of the demodulated envelope because of the signal processing delay, shown in FIG. 6A. The timing of the rise and fall of the demodulated envelope signal 61 shows a time delay of RT1 and FT1 versus the rise and fall time of the received RF signal 61, however the time errors are repetitious, and as will be explained later, because the errors are repetitious they present no errors for the recording and the utilization of unknown coded signals of the present invention.

Figure 2D:
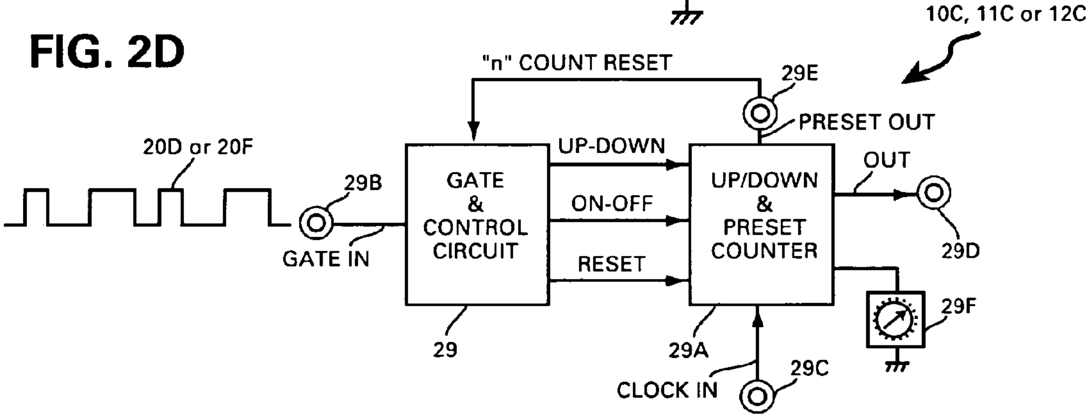

The demodulated envelope signal 20D or 20F is fed to a gate input 29B of a counter 10C, 11C or 12C shown in FIG. 2D and to an input 1, 2 or n of the CPU 18. Many different well known counters and counting methods can be used for recording and utilizing the unknown coded signals, and moreover many of the current well known CPUs that are commercially available at low cost incorporate counting and timing circuits, thereby providing for connecting and feeding the envelope signal directly to the CPU, making the counters 10C, 11C and 12C as a separate circuit unnecessary and not used, which is the preferred embodiment of this invention as shown in FIG. 3. However for clarification the counter is explained below as a separate circuit. The counting input 29C of the counter is fed with high frequency clock outputted from the CPU out 3 terminal, for example 10 MHz, by this the counting error of a single pulse width of the unknown coded envelope and/or the fall or rise time during the counting of the envelope is reduced to units of 0.1 μsec or 100 nsec, which are insignificant time units for the low frequencies of the unknown coded signals that may range from 200 Hz and up to 10 kHz.

Shown in FIG. 6A is the demodulated data envelope 63, which gates the counter 10C, 11C or 12C for counting the clock 64. As shown in FIG. 6A the rise and fall timing errors between the non synchronous envelope 63 and the clock signal 64 are RT2 and FT2, however since the timing errors cannot exceed the time duration of for example 100 nsec of the example clock frequency of 10 MHz, such timing errors of less than 100 nsec are wholly insignificant for the accuracy of the counting process and its influence on the utilization of the unknown coded signals generated by said remote control devices.

Figure 6B:
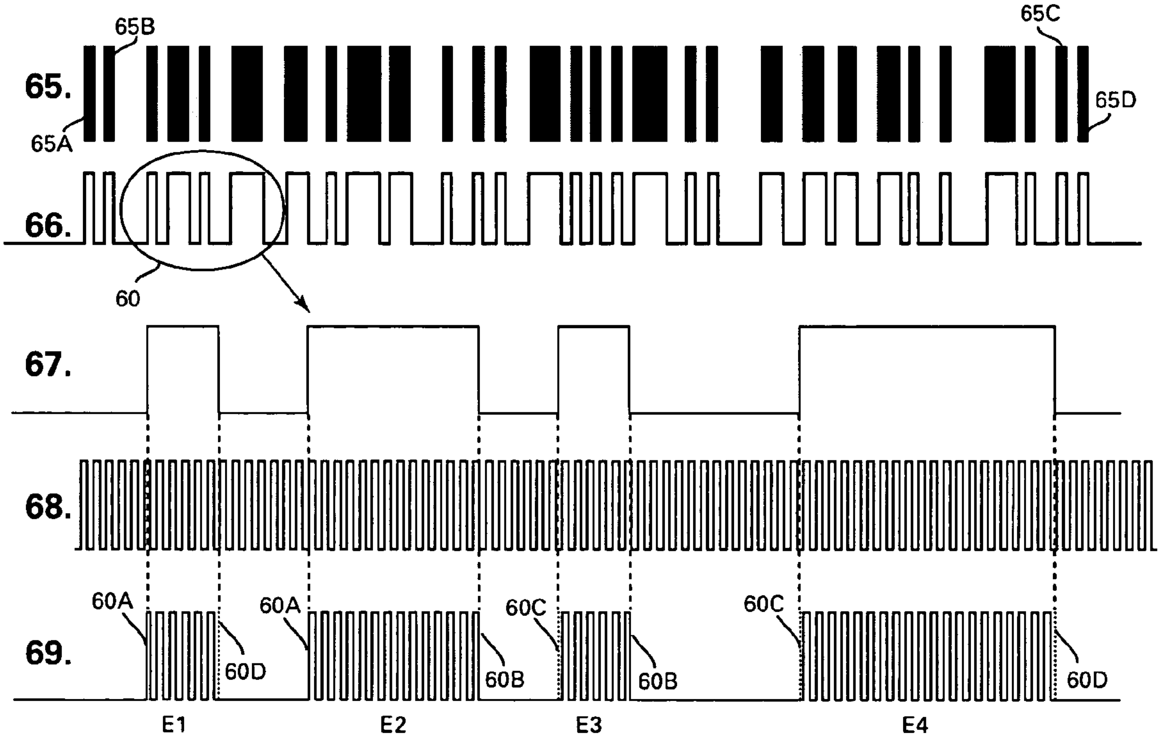

The portion 60 of the envelope 66 of the barcode 65 shown in FIG. 6B is expanded for showing the details of the counting errors associated with the rise and fall times. The envelope 67, which is the expanded waveform of the portion 60, is the gating signal for the counter 10C, 11C, 12C, 13C, 14C or 15C. The clock 68 is the clock fed to the counter's clocking input of FIG. 2D and which is non synchronized with the gating signal 67. Therefore the rise and fall times of the signal 67 and of the signal 68 are random times.

The result of this non synchronous state is shown in the waveform 69, wherein 60A and 60B are the rise and fall times with correct coincident of time between the signals 67 and 68, while the rise time 60C and the fall time 60D are error coincident of timing, between the two signals.

The waveform 69 shows the counting or timing errors of Pulse E1 having fall time error 60D, Pulse E2 having correct coincident of times or no timing errors, Pulse E3 having rise time error 60C and Pulse E4 having dual coincident of times error, shown as timing errors 60C and 60D.

From the above waveform 69 it becomes obvious that the maximum counting or timing error per pulse count is two half cycle values of the clock per pulse as shown in Pulse E4 of waveform 69, or 50%×2 clock pulses duration. In the example of the 10 MHz clock discussed above this will be $0.5\times2\times10^{-7}\times$Sec.=100 nano Sec. Such short time errors can be ignored altogether, and as will be explained later, it is simple to program a range of tolerances for permitting such errors during the process of matching the recorded values to a freshly counted values, particularly in the range of nano seconds, to be ignored and pass as match.

The counter 10C, 11C or 12C shown in FIG. 2D is an up-down counter with a separate preset output 29E and is gated by the envelop signal 20D or 20F that is fed to the gate and control circuit 29 such that a pulse rise resets the counter 29A to zero and starts the up counting, while a pulse fall also resets the counter 29A to zero but starts the down counting. The counter feeds to the input terminals 1A, 2A and 2n of the CPU 18 of FIG. 1 a positive count number for the duration of the highs of the envelope and a negative count number for the duration of the lows of the envelope.

The CPU 18 that is also fed directly through its input terminals 1, 2 and n with the envelope signal and reads directly the details of the envelope, can therefore record the duration of each individual high and low of the envelop signal, the number of highs and lows, the total lows, the total highs and the total length of the unknown code, these along with the counted values of each high and low and the total count or the sum pertaining the unknown coded signal as represented by the envelope. Considering the example of the 10 MHz clock, the counting accuracy of ±one count will be ±100 nsec time unit per pulse, which is insignificant.

Further, while the coded RF or IR signals explained above are based on two defined states, the high and the low, the RF coded signals can be AM or FM modulated to provide more than two states, similar to the barcode readers that identify multi width bars and intervals or spacings, such as the barcode 65 of FIG. 6B, for reading the full data contained in the barcode. The present invention provides for counting, detecting and defining not only high and low on the basis of the envelope's high and low counts, but also to detect the state of the pulse on the basis of the identified pulse width, such as three states low, mid and high, or such as five states low, mid low, mid, mid high and high to be used in the comparison process, for comparing the stored values and the freshly counted values.

Moreover the combination of counting the unknown coded signals through the counter 10C, 11C or 12C or through the CPU's 18A counting circuit and through the direct feeding of the envelope to the CPU input, enables many combinations of checks to verify the recording and the utilizing of the unknown coded signal such as the duration of each high and each low of the envelope, the time duration of each high, each mid and each low state, the sequence of each high, each mid and each low state, the total number of high states, mid states and low states, the total lows duration, total mids duration and total highs duration, the total count of lows, mids and highs, the total counted sum, the absolute total length of the envelope of said unknown code in clock count and in time and the polarity of the envelope and a combination thereof.

The above counted values of said unknown coded envelope of an unknown coded signal are recorded by storing the counting details into the memory 17 of FIG. 1 and FIG. 3. The stored values become the reference for utilizing said unknown coded envelope by comparing the stored values to a freshly received signal and its counted values.

The comparison process for comparing the data of the stored counted values and the data of a freshly received counted values is a well-known process of data comparison, commonly applied in every type of PC and other digital devices.

Figure 6C:
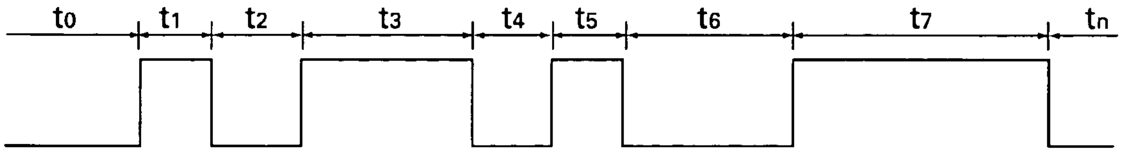
FIG. 6C is a timing chart of the counted waveform of FIG. 5B.

Shown in FIG. 6C is the recording of the principle timing details of the envelope shown in 67 of FIG. 6B. The shown time duration t1, t3, t5 and t7 are the time duration of the envelope highs, while t2, t4 and t6 are the time duration of the envelope lows. The combined envelope time is the sum up of t1~t7, the total sum=t1+t3+t5+t7−t2−t4−t6. The total envelope highs shown is 4 and total envelope lows shown is 3.

Referring to waveform 67 of FIG. 6B and to FIG. 6C it will become clear for example that; E1 and E3 are shown as the narrowest high pulses of the envelope with t1=t5, and therefore can be detected or defined as the high state pulse, the duration of E4 or t7 is shown as the longest, and therefore can be detected or defined as the low state pulse. E2 or t3 is the median duration pulse and thus, can be defined as mid state pulse. Same applies to the lows or the interval times of the envelope, shown as t2, t4 and t6 in FIG. 6C. t2 and t4 are shown as a narrow time and can be detected or defined as shortest low of the envelope, t6 is shown with the longest duration and therefore can be defined as longest low. As shown in the barcode envelope waveform 66 of FIG. 6B, there are several different envelope lows durations, all of which can be detected and defined as short mid, mid or long mid. This extensive data pertaining every detail of the envelope signals along with the ability to define multi level of states that are beyond the two binary states of high and lows of the digital signals, makes the recording and the comparing of the envelope signals very reliable for access control purposes.

The time duration t0 is a non-active state. It is shown in FIG. 6C as low state, but can be high state as well. The t0 should not be calculated into the total sum or total duration of the code. tn is the last counted duration, which exceeds a pre-selected or programmed time duration, such as 10 msec. or 100 msec. Longer time duration of a low or high state will terminate the recording or the counting of a freshly received unknown coded signal. As will be explained later the tn is therefore a fixed time duration that may be calculated into the total sum, or the total duration of the code, or it can be ignored, providing that it is repetitiously calculated or repetitiously ignored.

During the recording of an unknown coded signal it is necessary to record many related items and data associated with or indexed to the recording. This is necessary for systems, such as video interphone or intercom systems used for large apartment buildings, because it is necessary to identify the owner of the remote control device, his apartment number or his car. It is also necessary for identifying the particulars for the drive circuits 19A and 19N to output the programmed signal for correctly permitting access on the basis of the matched unknown coded signals, which is the basis for allowing access to an authorized user.

This is similar to a well known access control systems that the principle for permitting access is a well defined and recognized user, even though the coding methods used by common access control systems wherein the recording of every element of the code and the data is a complex process, while the process of the recording of the unknown coded signal of the present invention is as simple as described above.

Therefore, the indexed recording of the related or associated items, such as listing the owner of each remote control device and other details pertaining said owner, as well as other items such as the door to be opened, or the alarm system or emergency lighting system to be activated and/or the barrier to be raised needed to be recorded into the system memory 17S. The code memory 17 and the system memory 17S are shown as a separate memory circuits, but can be combined or partitioned into any well-known memory device, such as flash memory, or into a flash memory that is part of the CPU 18 or 18A.

Once the recording of the counting details of said unknown coded envelope is complete, the receiving, decoding and counting of the envelope of a repeat fresh transmission, generated by said remote control device 10, for accessing purpose is compared with the stored values of said unknown coded envelope. Only when both values, the freshly counted values and the stored values match, the CPU 18 of FIG. 1 and 18A of FIG. 3 will generate a match signal through the drive circuit 19A or 19N. The drive circuits 19A or 19N may include a relay for opening doors or for raising parking barrier and/or a buffer circuit for feeding serial or parallel codes, known as protocols, for enabling an access to a building by recalling of a selected elevator to the lobby or to any selected floor and/or for disarming the alarm system and/or the emergency system and/or for illuminating the entrance lobby of the building.

The CPU 18 of FIG. 1 and the CPU 18A of FIG. 3 can be a well known microprocessor used for PC such as the well known Pentium by Intel and other microprocessors, or it can be a well known digital signal processor, also known as DSP device, or it can be well known custom programmed gate array or similar custom programmed devices. As will be explained later, it is preferable that the single package CPU 18A of FIG. 3 will include a memory portion 17 and 17S, such as flash memory.

The apparatus 1 and 1A for recording and utilizing unknown coded signal of the present invention provides for the use of IR remote control devices 13 the same way it provides for the RF remote control devices 10. For this purpose at least one IR receiver comprising IR filter 13F, lens 13L and photo sensing diode 13S, along with demodulator and processing circuit 13 are incorporated in the apparatus for recording and utilizing unknown coded signals 1 and 1A. The demodulator 13D for demodulating and processing the received IR signals is similar to said RF demodulators 10D, 11D or 12D. The commonly used demodulator circuit 13D is OOK type because the commonly used IR remote control devices are operated on the basis of on-off keying, but any other modulation and demodulation circuits can be employed.

The steps of demodulating, processing, counting and storing the unknown coded signal generated by an IR remote control device 13 and the steps of comparing the freshly counted envelope of the received IR signals are same as the steps described for the received RF signals. Same also applies to an unknown code of an accessing key, such as magnetic key processed by the reader 14R, or to the directly fed unknown serial or parallel code signals to input 15, all of which are processed and their envelopes are shaped, counted, decoded, and stored the same way as described for the received RF or IR signals.

The remote control devices, including such devices as magnetic card or a barcode card, are configured to transmit or to generate via their corresponding readers respectively a complete, whole code. Some types of remote control devices are configured to repeat the transmission of the serial coded signal, others transmit the complete serial code once per each touch of a key. However all the remote control devices transmit a complete coded signal, which commonly starts with a pilot bit, sync bit and/or start bit and ends with an end bit.

The commonly used receivers, readers and the processors for the remote control devices and/or the magnetic, proximity and other keys or cards are pre configured to read and accept only incoming coded signals that precisely match the pre configured codes, the timing of the pulses, the pulses duration and the precise start bit, the address data, command data and other exclusively configured programs to ensure that only an exclusive pre configured and pre programmed match can access the appliance and/or the system.

Shown in FIG. 6B is a bar code 65 of a well known barcode standard, in which the width of the bars, the spacing between the bars, the number of bars and the width of the spacing are preprogrammed data for pre-configured access. The two shown narrow bars 65A and 65B at the left side of the bar 65 are the start bars or the start bit shown in 66 and the two narrow bars 65C and 65D are the end bars or end bits shown in 66. Accordingly, the barcode reader will not process the bar code unless the start bits and end bits are correctly read.

In contrast, the present invention provides for the use of any such remote control devices, for example, elderly people may use emergency remote control device such as bracelet, charm, pendant or button for transmitting RF or IR signals during emergency, while others may use cards, tags or strip with mechanical code, magnetic code, bar code, or other optical code. The remote control devices may further include such devices as magnetic keys, barcodes, proximity keys, RFID contactless card and other access devices such as finger print reader or face recognition reader by recording the complete unknown coded signals generated by the device or its reader, including such pulse items as pilot, sync, start bit and end bit, all of which become leading pulses and ending pulses within the unknown recorded signals, stored into said memory.

Therefore, for the counting process of the present invention there is no need for pilot bit, sync bit or start bit to initiate the counting process, and the counter starts its counting whenever its gate input is fed with a rise or a fall in the envelope signal fed to it. For ending the counting and/or for completing the counting process of the received signal the counter is programmed to reset itself and stop counting whenever the high or low state remains for a longer duration than “n” milli seconds.

The counter 10C, 11C or 12C, shown in FIG. 2D incorporate a preset setting selector 29F for selecting a preset time duration count, or for selecting a preset clock count, representing time duration, for example 10,000 clock pulses count of 10 MHz clock is equal to 1 milli sec. The example counter 10C, 11C or 12C is designed to stop counting when the preset number is reached and change the state of preset out 29E from low to high, but can be also from high to low. The preset out is fed to the gate and control circuit 29 for resetting the counter 29A through the reset line to zero and to stop the counting by switching the on-off line to off state. By this the counter 10C, 11C or 12C is reset to its “ready for counting” state, awaiting next fed rise or fall time of a signal fed to its gate input 29B. As the signal is fed the gate switches its on-off command line to on state and its up-down command line in accordance to the rise or fall state of the received signal. This arrangement of the counting process provides for repetitious counting of the unknown coded signal without errors.

The resetting of the counter 10C, 11C, 12C, 13C, 14C or 15C also provide for resetting the system’s CPU 18 or 18A into its receiving state and for enabling the receiving of a freshly transmitted unknown coded signal. It is simple to configure the “n” duration, for example, when the slowest rate possible of the unknown code signal is 1 kbit/sec., the width of each low and/or high state of the envelope signal cannot practically exceed 1 milli second duration, therefore “n” duration of longer than, for example, 10 milli second or 100 milli seconds can be safely configured as an error free end of the transmission, or to identify no transmission state and therefore, provide for the counter to reset itself and the resetting of the CPU to its “receiving ready” state, readying the system for the next fresh receiving.

As the gate input 29B is sensitive to rise and fall times of the signal fed to it and therefore, it is sensitive to random noises, particularly high frequency noises, and moreover, to a noisy unknown coded signal that may reach the gate input 29B because of weak RF reception, such as may be caused by use of the remote control devices 10 from far distance, generating noisy fed signal 20E shown in FIG. 2C. Therefore, the signals fed to the counter 10C, 11C 12C and the counters 13C, 14C and 15C and/or to the CPU 18 of FIG. 1 and 18A of FIG. 3, need to be processed and filtered through a LPF circuit such as 27B shown in FIG. 2C or other type of well known filters, amplified and clipped and/or clamped as explained, in order to output clean, sharp edged envelope signal such as the signal 20F shown in FIG. 2C.

Figure 5A:
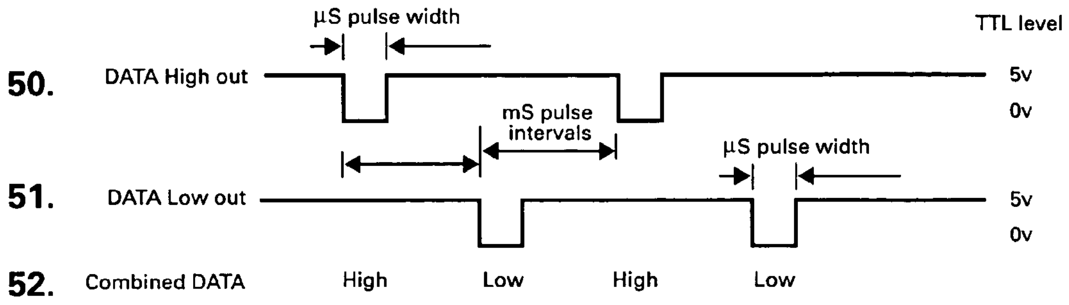
FIGS. 5A~5C are well known waveforms, processed, used and transmitted by access control devices and IR remote control devices.

Common access control systems such as systems using access readers for contactless keys, including proximity keys or RFID devices, employ communication lines that propagate the data lows and the data highs of the coded signals via two separate drivers as shown in FIG. 2A. The reversed polarity pulses 20 and 20A are the high data pulses and the low data pulses. To use such propagated data signals with the present invention for recording and utilizing unknown coded signal the data lows and data highs must be combined into a single input however, the width of the low 20A and the high 20 data pulses is same and the time interval between the pulses is identical. Shown in FIG. 5A are the details of the data high out 50 and the data low out 51 and wherein the pulse width in micro seconds and pulse interval in milli seconds are identical for the low and the high data pulses. The reading of the combined data shown in 52 is only possible with the two separated outputs. This prevents the combining of the data low and high in their present form into a serial code via a single line, as there will be no difference between the low data and the high data pulses.

To overcome this and similar confusing data signals, having identical pulses for the high and the low state, the low data line is fed to an input of the well known mono stable 23 shown in FIG. 2A that generates for each received pulse a single pulse with pre selected width, for widening, for example, the pulse width of the low data and outputting wider low data pulse 20C. Having two different pulse widths for the low and the high data makes it possible to combine the two separate lines into one. As shown in FIG. 2A the high data is directly fed to the input 24B of the OR gate 24 and the low data line with the wider data pulses are fed to the input 24A of the OR gate 24. By this the two data lines are gated one after the other and combined into one serial code outputted from the output 25 of the or gate. The serial code 20D is inverted signal for providing unified processing for all the received unknown coded signals and for this purpose the OR gate 24 shown in FIG. 2A is an inverting OR gate. However this inversion of the unknown coded signal is not necessary and non-inverting OR gate can be used instead.

Figure 5B:
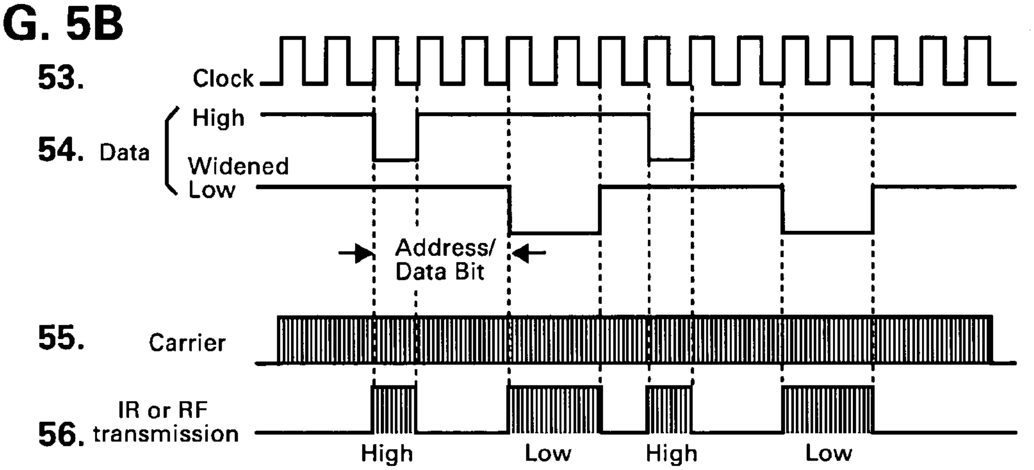

The unknown serially coded output is fed to the counter 14C or 15C and/or to the CPU 18 or 18A for processing and storing the fed unknown coded signal the same way as described for the data generated by the RF or IR remote control devices. The unknown coded signal 20D however is a modified envelope of the original data signal 20 and 20A shown in FIG. 2A. Same will apply if a combined signal is fed to an RF remote control device for modulating the carrier 55 shown in FIG. 5B, in which the two data signals the high and the widened low 54 are timely generated, synchronized with their basic clock 53, to transmit an RF or IR OOK modulated signal 56, even though they are not the exact replica or the exact envelope of the original data signal 20 and 20A.

Yet, even though it is clear that the original shaped signal, such as the waveforms 50 and 51 shown in FIG. 5A are modified and inverted, the advantage of the present invention is that an identical repetitious processing of the unknown coded signal generates an identical unknown coded signal. Once such modified unknown coded signal is stored, the freshly modified identical unknown coded signal can be compared and match the stored signal with no error.

Figure 5C:
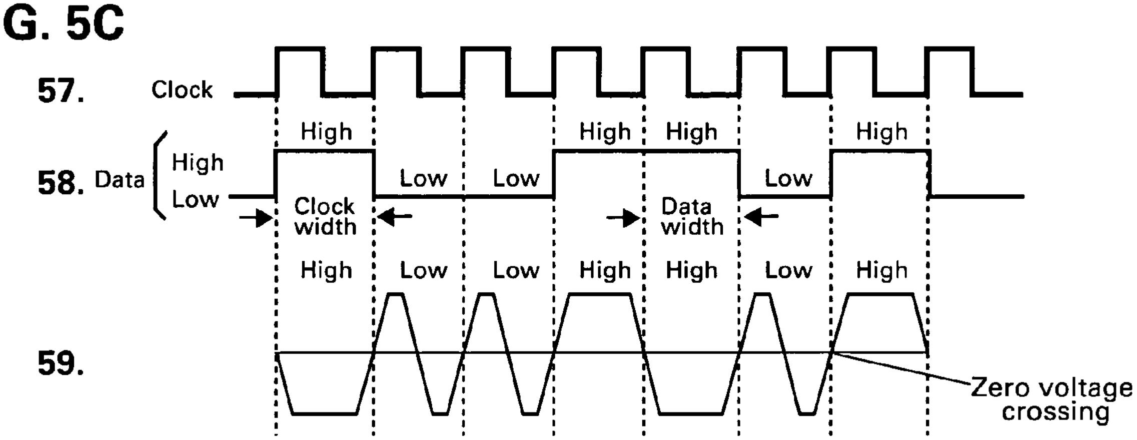

Another example of a modulated or encoded unknown code signal is the well-known FM-0 data signal shown in FIG. 5C. The FM-0 modulated or encoded signal is synchronized with the clock 57 and timed by the synchronous data signal 58 to generate the waveform 59 and is used in access control and security systems network for connecting to access control readers and alarm devices. Accordingly a demodulator or decoder for demodulating or decoding the FM-0 modulated unknown coded signal can be included in apparatus 1 or 1A of FIG. 1 and FIG. 3 respectively. Though not shown, the decoder for the FM-0 is commonly available in a single package IC at low cost. By the inclusion of FM-0 demodulator or decoder to the processor/decoder and shaper circuit 14D or 15D the apparatus 1 or 1A of FIG. 1 and FIG. 3 are made further flexible for connecting variety of access devices into buildings and parkings and moreover the same devices can be used by tenants to arm or disarm their alarm system or activate an emergency procedure with ease, using their access remote control device, most importantly, such as their remote control car key.

Some type of readers generate and output parallel data, which also cannot be processed by the apparatus 1 or 1A as is, for this purpose it is possible to include a well known parallel to serial code converter 26 as shown in FIG. 2B for the processing circuits 14D or 15D of FIG. 1 and FIG. 3.

The parallel to serial converter is commonly available in a single chip IC at low cost and it provides for inputting parallel high and low data through its input terminals 26A, 26B, 26C and 26D and outputting a serial code 20D through its output terminal 27. By this the apparatus 1 and 1A of the present invention becomes even more flexible apparatus for recording and utilizing unknown coded signals of remote control devices.

It is preferable that a remote control device such as an IR key holder 13 that is equipped with multiple touch keys 13K shown in FIG. 1 and FIG. 3 such as alphanumeric keys can be used to access, for example, into a parking system, by keying a programmed password through the touch keys 13K of the remote control device 13. A limitation for multiple keying of unknown coded signals will therefore be the time spacing or interval between the keying, which must be longer than said "n" time duration. As the "n" time duration is a fraction of a second, such as between 10 milli second and 100 milli second, such short time duration does not prevent in any practical way the multiple keying of a password via said keys 13K of said remote control device 13.

The sequence of the keying of a password, for example such as 3-1-4-2, will be the counted values of the four individual envelopes in sequence of 3-1-4-2 that are recorded individually, one after another into the memory 17, for which the CPU 18 or 18A is programmed to compare individually the four separate envelope counts in the sequence, to a freshly received signals and only when all the four fresh envelope signals of all the four individual numeric coded transmissions match the separately four stored signals and their sequence matches the programmed sequence, only than the CPU 18 or 18A will generate a match signal through the drive circuit 19A or 19N for enabling the activation or deactivation of said appliances and/or of said systems.

Similarly, it is possible to program a repeat transmission by any of said remote control devices in order to access the entrance of a building and/or to arm an alarm system of a given apartment. This can be achieved by repeating the recording of the unknown envelope count and/or by programming the CPU 18 or 18A to generate match signal only after receiving match signal "n" times in succession.

Many other programs can be devised for providing access protection and security. Other programs can be used to provide tolerances for permitting pre-configured errors in the matching processes between the stored unknown coded signal values and the fresh counted values, such as for permitting minor counting errors due to rise and fall times, this is to prevent unnecessary rejection by the system of a genuine access attempts.

Figure 7:
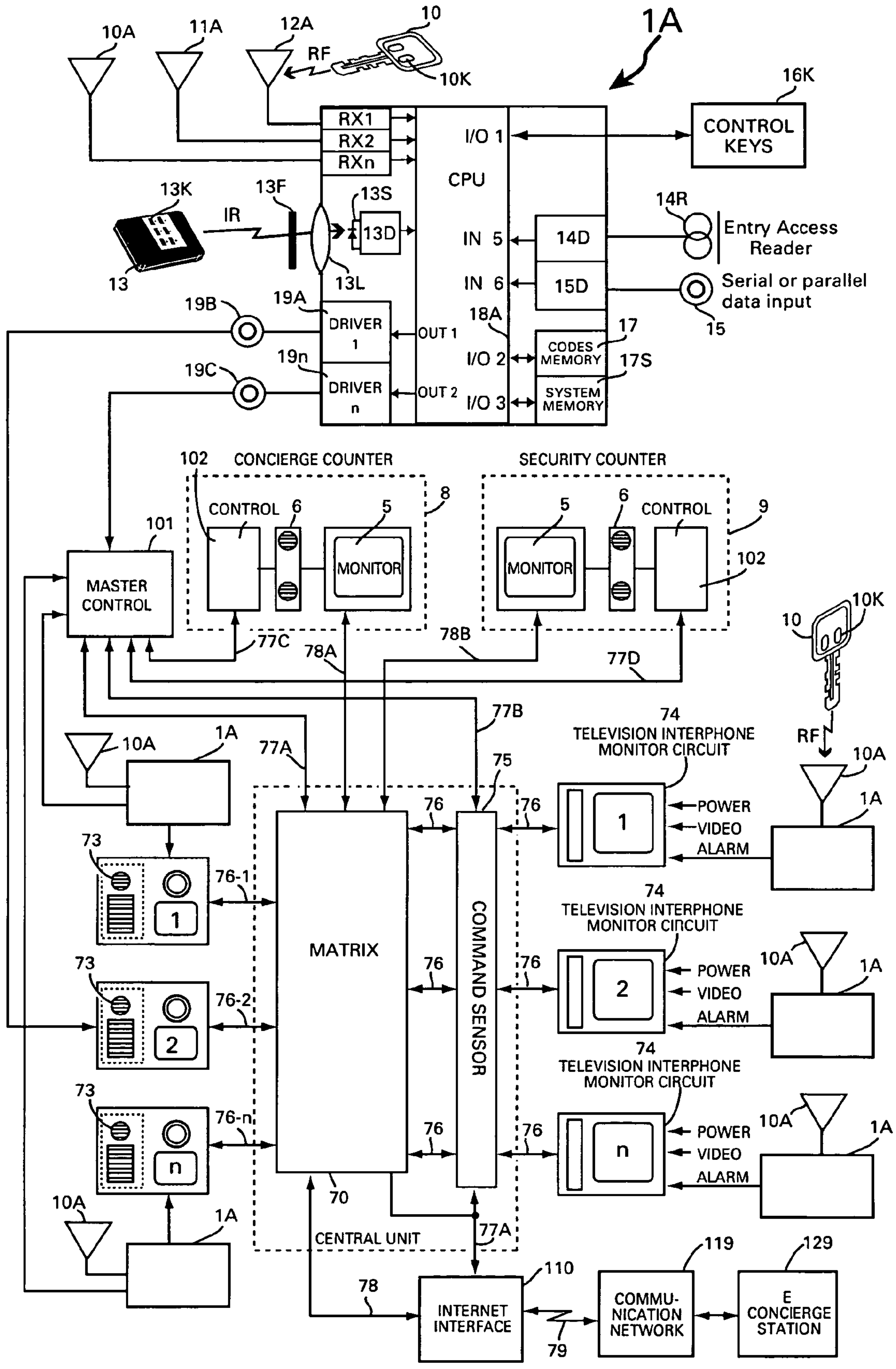
FIG. 7 is an electrical block diagram showing the application of the preferred embodiment of FIG. 3 with well-known video interphone system.

Shown in FIG. 7 is the apparatus 1A connected to well-known video interphone systems, which are disclosed in U.S. Pat. Nos. 6,603,842 and 5,923,363. The video interphone system includes concierge counter 8, security center 9, n number of entrance panels 73 and n number of television video interphones 74, all connected to a central unit comprising matrix 70, command sensor 75 and a master control 101. The master control is designed to command the access of all the entrances associated with the panels 73 and others, such as the parking barriers, not shown, and services entrances, the elevators and the like.

The concierge and/or the security guard can communicate with tenants 74, entry panels 73 and control the alarm system and/or provide access to visitors. The tenants 74 can communicate with the entry panels 73 and with the concierge 8 and the guard 9 and can provide entry access to a visitor through the entry panels 73.

Each of the entry panels 73 provides for direct keying of a code for releasing the electrical door lock of the door associated with the entry panel. Similarly, each of the apartments can arm its alarm system by keying a coded password through alarm keys. Details of the video interphone systems are disclosed in the referenced U.S. Pat. Nos. 6,603,842 and 5,923,363

By this it will become clear that the apparatuses 1A shown in FIG. 7 connected to the controller 101 and to each of the entry panels 73 can provide to a tenant access to a building through any of the entrances by using his car key, such as the remote control device 10 shown in FIG. 7.

Similarly, the tenants having the apparatus 1A connected to their television interphone monitor 74 can activate, arm or disarm their alarm system, using the same car key, or for example two different car keys that their unknown coded signal were stored in the apparatus 1A of their own apartment, which is convenient and easy to use.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for recording and utilizing an unknown coded signal of a remote control device of a first appliance for controlling a second appliance having its own respective coded remote control signal, said remote control device includes a device selected from a group consisting of a key, key holder, card, tag, strip, button, charm, pendant, bracelet and a combination thereof, through an interfacing circuit including at least one receiving input selected from a group consisting of an RF receiver, IR receiver, access control reader, data receiver and a combination thereof, central processing unit, memory and at least one output, said interfacing circuit associated with said second appliance comprising the steps of:

receiving said unknown coded signal of said remote control device through said receiving input for extracting and outputting an envelope of said unknown coded signal to said central processing unit;

processing said envelope via said central processing unit through a process selected from a group consisting of detecting rise and fall times, up-down counting, counting, resetting, detecting time duration, detecting pulse width, defining intervals state, defining pulses state and a combination thereof for generating data pertaining to said envelope selected from a group consisting of the duration of each low of the envelope, the duration of each high of the envelope, the duration of the whole lows of the envelope, the duration of the whole highs of the envelope, the duration of the whole envelope, the sum of the whole lows and the whole highs of the envelope, the polarity of the envelope, the low state pulses on the basis of time duration, the high state pulses on the basis of time duration, mid state pulses on the basis of time duration, the total number of low state pulses, the total number of high state pulses, the total number of mid state pulses, the sequence of the whole low state and high state pulses, the sequence of the whole low state, high state and mid state pulses and a combination thereof;

storing said data pertaining to said envelope into said memory; and comparing the stored data with a newly generated data pertaining to an envelope of a newly received unknown coded signal and outputting match signal through said output when said stored data and said newly generated data match.

2. The method for recording and utilizing unknown coded signal of a remote control device according to claim 1, wherein said at least one output is a driver output circuit selected from a group consisting of a relay, electric switch, a serial code buffer, parallel code buffer and a combination thereof for operating with said second appliance, both said appliances selected from a group consisting of door lock, house door, building door, car lock, car door, car ignition, car alarm, barrier, garage barrier parking barrier, elevator, lighting, alarm sensor, alarm controller, emergency sensor, emergency controller and a combination thereof.

3. The method for recording and utilizing an unknown coded signal of a remote control device according to claim 2, wherein said second appliance further includes a system selected from a group consisting of video interphone systems, door phone system, alarm system, emergency system, access control system, parking system and a combination thereof.

4. The method for recording and utilizing unknown coded signal of a remote control device according to claim 1, wherein said second appliance further includes a system selected from a group consisting of video interphone systems, door phone system, alarm system, emergency system, access control system, parking system and a combination thereof.

5. The method for recording and utilizing an unknown coded signal of a remote control device according to claim 1, wherein said remote control device includes keys for generating a sequence of unknown coded signals and said method comprising the further steps of:

receiving in sequence said unknown coded signals of said remote control device for outputting the envelopes of said unknown coded signals in said sequence to said central processing unit;

processing said envelopes in said sequence via said central processing unit for storing the data pertaining to said envelope and to said sequence into said memory; and comparing the stored data with a newly generated data pertaining to the envelopes of a newly received unknown coded signals in said sequence and outputting match signal through said output when said stored data and said newly generated data and said sequence match.

6. The method for recording and utilizing an unknown coded signal of a remote control device according to claim 5, wherein said sequence includes a sequence of repeatedly generating said unknown coded signal.

7. A method for recording and utilizing an unknown coded signal selected from a group comprising serial code, parallel code, coded data and a combination thereof generated by an access control reader selected from a group consisting of punched card reader, magnetic card reader, bar code reader, optical card reader, proximity reader, finger print reader, eye pattern reader, face recognition reader, RFID reader and a combination thereof of a first access control appliance for operating a second appliance having its own respective coded remote control signal via an interfacing circuit including at least one receiving input selected from a group comprising serial code receiver, parallel code receiver, data receiver and a combination thereof, central processing unit, memory and at least one output, said interfacing circuit associated with said second appliance comprising the steps of:

receiving said unknown coded signal of said access reader and processing the received signal for outputting a serial envelope of said unknown coded signal to said central processing unit;

reprocessing said envelope via said central processing unit through a reprocess selected from a group consisting of detecting rise and fall times, up-down counting, counting, resetting, detecting time duration, detecting pulse widths, defining intervals state, defining pulses state and a combination thereof for generating data pertaining said envelope selected from a group consisting of the duration of each low of the envelope, the duration of each high of the envelope, the duration of the whole lows of the envelope, the duration of the whole highs of the envelope, the duration of the whole envelope, the sum of the whole lows and the whole highs of the envelope, the polarity of the envelope, low state pulses on the basis of time duration, high state pulses on the basis of time duration, mid state pulses on the basis of time duration, the total number of low state pulses, the total number of high state pulses, the total number of each mid state pulses, the sequence of the whole low state and high state pulses, the sequence of the whole low state, high state and mid state pulses and a combination thereof;

storing said data pertaining to said envelope into said memory; and comparing the stored data with a newly generated data pertaining to said envelope of a newly received unknown coded signal and outputting match signal through said output when said stored data and said newly generated data match.

8. The method for recording and utilizing an unknown coded signal of a remote control device according to claim 7, wherein said at least one output is a driver output circuit selected from a group consisting of a relay, electric switch a serial code buffer, parallel code buffer and a combination thereof for operating with said second appliance selected from a group consisting of door lock, house door, building door, car lock, car door, car ignition, car alarm, barrier, garage barrier, parking barrier, elevator, lighting, alarm sensor, alarm controller, emergency sensor, emergency controller and a combination thereof.

9. The method for recording and utilizing an unknown coded signal of a remote control device according to claim 8, wherein said at least one said driver output circuit is connected to and operated in conjunction with a system selected from a group consisting of video interphone systems, door phone system, alarm system, emergency system, parking system and a combination thereof.

10. The method for recording and utilizing an unknown coded signal of a remote control device according to claim 7, wherein said second appliance further include a system selected from a group consisting of video interphone systems, door phone system, alarm system, emergency system, parking system and a combination thereof.

11. An apparatus for recording and utilizing an unknown coded signal of a remote control device of a first appliance for controlling a second appliance having its own respective coded remote control signal, said remote control device including a device selected from a group consisting of a key, key holder, card, tag, strip, button, charm, pendant, bracelet and a combination thereof, through an interfacing circuit comprising;

at least one receiving input selected from a group consisting of an RF receiver, IR receiver, access control reader, data receiver and a combination thereof, central processing unit, memory and at least one output, said interfacing circuit associated with said second appliance;

wherein said receiving input receives said unknown coded signal for extracting and outputting an envelope of said unknown coded signal to said central processing unit;

said central processing unit processes said envelope through a process selected from a group consisting of detecting rise and fall times, up-down counting, counting, resetting, detecting time durations, detecting pulse widths, defining intervals state, defining pulses state and a combination thereof for generating data pertaining to said envelope selected from a group consisting of the duration of each low of the envelope, the duration of each high of the envelope, the duration of the whole lows of the envelope, the duration of the whole highs of the envelope, the duration of the whole envelope, the sum of the whole lows and the whole highs of the envelope, the polarity of the envelope, the low state pulses on the basis of time duration, the high state pulses on the basis of time duration, mid state pulses on the basis of time duration, the total number of low state pulses, the total number of high state pulses, the total number of mid state pulses, the sequence of the whole low state and high state pulses, the sequence of the whole low state, high state and mid state pulses and a combination thereof for storing said data pertaining said envelope into said memory; and wherein said central processing unit compares the stored data with a newly generated data pertaining to an envelope of a newly received unknown coded signal and outputs match signal through said output when said stored data and said newly generated data match.

12. The apparatus for recording and utilizing an unknown coded signal of a remote control device according to claim 11, wherein said at least one output is a driver output circuit selected from a group consisting of a relay, electric switch, a serial code buffer, parallel code buffer and a combination thereof for operating with said second appliance, both said appliances selected from a group consisting of door lock, house door, building door, car lock, car door, car ignition, car alarm, barrier, garage barrier, parking barrier, elevator, lighting, alarm sensor, alarm controller, emergency sensor, emergency controller and a combination thereof.

13. The apparatus for recording and utilizing an unknown coded signal of a remote control device according to claim 11, wherein said second appliance further includes a system selected from a group consisting of video interphone systems, door phone system, alarm system, emergency system, access control system, parking system and a combination thereof.

14. The apparatus for recording and utilizing an unknown coded signal of a remote control device according to claim 12, wherein said second appliance further includes a system selected from a group consisting of video interphone systems, door phone system, alarm system, emergency system, access control system, parking system and a combination thereof.

15. An apparatus for recording and utilizing an unknown coded signal selected from a group comprising serial code, parallel code, coded data and a combination thereof generated by an access control reader selected from a group consisting of punched card reader, magnetic card reader, bar code reader, optical card reader, proximity reader, finger print reader, eye pattern reader, face recognition reader, RFID reader and a combination thereof of a first access control appliance for operating a second appliance having its own respective coded remote control signal via an interfacing circuit comprising;

at least one receiving input selected from a group comprising serial code receiver, parallel code receiver, data receiver and a combination thereof, central processing unit, memory and at least one output, said interfacing circuit associated with said second appliance comprising the steps of:

receiving said unknown coded signal of said access reader and processing the received signal for outputting a serial envelope of said unknown coded signal to said central processing unit;

said central processing unit reprocesses said envelope through a reprocess selected from a group consisting of detecting rise and fall times, up-down counting, counting, resetting, detecting time duration, detecting pulse widths, defining intervals state, defining pulses state and a combination thereof for generating data pertaining to said envelope selected from a group consisting of the duration of each low of the envelope, the duration of each high of the envelope, the duration of the whole lows of the envelope, the duration of the whole highs of the envelope, the duration of the whole envelope, the sum of the whole lows and the whole highs of the envelope, the polarity of the envelope, the low state pulses on the basis of time duration, the high state pulses on the basis of time duration, mid state pulses on the basis of time duration, the total number of low state pulses, the total number of high state pulses, the total number of mid state pulses, the sequence of the whole low state and high state pulses, the sequence of the whole low state, high state and mid state pulses and a combination thereof;

storing said data pertaining to said envelope into said memory; and wherein said central processing unit compares the stored data with a newly generated data pertaining to an envelope of a newly received unknown coded signal and outputs a match signal through said output when said stored data and said newly generated data match.

16. The apparatus for recording and utilizing unknown coded signal of a remote control device according to claim 15, wherein said at least one output is a driver output circuit selected from a group consisting of a relay, electric switch, a serial code buffer, parallel code buffer and a combination thereof for operating with said second appliance, both said appliances selected from a group consisting of door lock, house door, building door, car lock, car door, car ignition, car alarm, barrier, garage barrier, parking barrier, elevator, lighting, alarm sensor, alarm controller, emergency sensor, emergency controller and a combination thereof.

17. The apparatus for recording and utilizing unknown coded signal of a remote control device according to claim 16, wherein said second appliance further includes a system selected from a group consisting of video interphone systems, door phone system, alarm system, emergency system, access control system, parking system and a combination thereof.

18. The apparatus for recording and utilizing unknown coded signal of a remote control device according to claim 15, wherein said second appliance further includes system selected from a group consisting of video interphone systems, door phone system, alarm system, emergency system, parking system and a combination thereof.

19. A method for recording and utilizing an unknown coded signal of a remote control device whose coded signal is set to operate a first device, the method comprising the steps of:

receiving said unknown coded signal of said remote control device at an interfacing circuit associated with a second device having its own respective coded remote control signal, said interfacing circuit including a receiver, a central processing unit, a memory and at least one output;

extracting said unknown coded signal from the received signal and outputting; the envelope of the extracted unknown code to said central processing unit;

generating data pertaining to said envelope via said central processing unit;

storing said data pertaining to said envelope into said memory;

comparing the stored data with a newly generated data pertaining to the envelope of a newly received unknown coded signal; and outputting a match signal through said output when said stored data and said newly generated data match.

20. The method for recording and utilizing unknown coded signal of a remote control device according to claim 19, wherein said at least one output is a driver output circuit selected from a group consisting of a relay, electric switch, a serial code buffer, parallel code buffer and a combination thereof.

21. The method for recording and utilizing unknown coded signal of a remote control device according to claim 20, wherein said at least one said driver output circuit is connected to and operated in conjunction with a system selected from a group consisting of video interphone systems, door phone system, alarm system, emergency system, access control system, parking system and a combination thereof.

22. The method for recording and utilizing unknown coded signal of a remote control device according to claim 19, wherein said at least one output is connected to and operated in conjunction with a system selected from a group consisting of video interphone systems, door phone system, alarm system, emergency system, access control system, parking system and a combination thereof.

23. The method for recording and utilizing unknown coded signal of a remote control device according to claim 19, wherein said remote control device includes keys for generating a sequence of unknown coded signals, said method further comprising the steps of:

receiving in sequence said unknown coded signal of said remote control device and outputting envelopes of said unknown coded signals in said sequence to said central processing unit;

processing said envelopes in said sequence via said central processing unit and storing the data pertaining to said envelopes and said sequence into said memory; and comparing the stored data with a newly generated data pertaining to the envelopes of the newly received unknown coded signals in said sequence and outputting a match signal through said output when said stored data and said newly generated data and said sequence match.

24. The method for recording and utilizing unknown coded signal of a remote control device according to claim 23, wherein said sequence includes a sequence of repeatedly generating said unknown coded signal.

25. The method for recording and utilizing unknown coded signal of a remote control device according to claim 19, wherein said remote control device includes a device selected from the group consisting of key, key holder, card, tag, strip, button, charm, pendant, bracelet and combinations thereof.

26. The method for recording and utilizing unknown coded signal of a remote control device according to claim 19, wherein said receiver is selected from the group consisting of an RF receiver, IR receiver, access control reader, data receiver and combinations thereof.

27. The method for recording and utilizing unknown coded signal of a remote control device according to claim 19, wherein said processing step is selected from the group consisting of detecting rise and fall times, up-down counting, counting, resetting, detecting time duration, detecting pulse width, defining intervals state, defining pulses state and combinations thereof.

28. The method for recording and utilizing unknown coded signal of a remote control device according to claim 19, wherein the data generated by said generating step is selected from the group consisting of the duration of each low of the envelope, the duration of each high of the envelope, the duration of the whole lows of the envelope, the duration of the whole highs of the envelope, the duration of the whole envelope, the sum of the whole lows and the whole highs of the envelope, the polarity of the envelope, low state pulses on the basis of time duration, high state pulses on the basis of time duration, the mid state pulses on the basis of time duration, the total number of low state pulses, the total number of high state pulses, the total number of mid state pulses, the sequence of the whole low state and high state pulses, the sequence of the whole low state, high state and mid state pulses and combinations thereof.

29. The method for recording and utilizing unknown coded signal of a remote control device according to claim 19, wherein the method operates appliances selected from the group consisting of door locks, house doors, building doors, car locks, car doors, car ignition, car alarm, barriers, garage barriers, parking barriers, elevators, lighting, alarm sensors, alarm controller, emergency sensors, emergency controllers and combinations thereof.

* * * * *